US007835938B1

(12) United States Patent
Karlsson

(10) Patent No.: US 7,835,938 B1
(45) Date of Patent: Nov. 16, 2010

(54) SYSTEMS AND METHODS FOR SHAPING A REFERENCE SIGNAL IN ADVERTISING

(75) Inventor: Niklas Karlsson, Mountain View, CA (US)

(73) Assignee: AOL Advertising Inc., Baltimore, MD (US)

( * ) Notice: Subject to any disclaimer, the term of this patent is extended or adjusted under 35 U.S.C. 154(b) by 408 days.

(21) Appl. No.: 11/979,096

(22) Filed: Oct. 31, 2007

(51) Int. Cl.
*G06F 17/00* (2006.01)
(52) U.S. Cl. ........................................... 705/10
(58) Field of Classification Search ..................... 705/10
See application file for complete search history.

(56) References Cited

U.S. PATENT DOCUMENTS

| 5,227,874 | A | 7/1993 | Von Kohorn | |
|---|---|---|---|---|
| 5,446,919 | A | 8/1995 | Wilkins | |
| 6,006,197 | A * | 12/1999 | d'Eon et al. | 705/10 |
| 7,039,599 | B2 | 5/2006 | Merriman et al. | |
| 7,212,974 | B2 | 5/2007 | Kilbank | |
| 2003/0033405 | A1 | 2/2003 | Perdon et al. | |
| 2003/0225738 | A1 | 12/2003 | Ternoey et al. | |
| 2005/0086605 | A1 | 4/2005 | Ferrer et al. | |
| 2005/0096950 | A1 * | 5/2005 | Caplan et al. | 705/7 |
| 2006/0085419 | A1 | 4/2006 | Rosen | |
| 2006/0122879 | A1 * | 6/2006 | O'Kelley | 705/14 |
| 2006/0224447 | A1 | 10/2006 | Koningstein | |
| 2007/0027754 | A1 | 2/2007 | Collins et al. | |
| 2007/0118425 | A1 | 5/2007 | Yruski et al. | |
| 2007/0244760 | A1 | 10/2007 | Bodnar et al. | |
| 2007/0261072 | A1 | 11/2007 | Boulet et al. | |
| 2008/0052140 | A1 | 2/2008 | Neal et al. | |
| 2009/0157442 | A1 | 6/2009 | Tesler | |

OTHER PUBLICATIONS

Colombo, Richard; A Model for Diagnosing and Reducing Nonresponse Bias; Jan.-Apr. 2000; Journal of Advertising research, p. 85; dialog copy.*
Copending U.S. Appl. No. 11/907,587, filed Oct. 15, 2007, in the name of Midas Karlsson, entitled "Revenue Smoothness Control."
Copending U.S. Appl. No. 11/979,098, filed Oct. 31, 2007, in the name of Niklas Karlsson, entitled "Advertising Revenue Predictor."

* cited by examiner

*Primary Examiner*—Thomas Dixon
(74) *Attorney, Agent, or Firm*—Finnegan, Henderson, Farabow, Garrett & Dunner, LLP

(57) ABSTRACT

A system, apparatus, and method are presented for shaping a reference signal from an advertising campaign that allocates advertisements in digital or online advertising. The method includes receiving a reference signal; providing parameters representing a volume of revenue generating events resulting from the advertising campaign; shaping the received reference signal to adjust for variations in the volume of revenue generating events; and using the shaped reference signal to determine a control signal to control the allocation of advertisements.

16 Claims, 8 Drawing Sheets

US 7,835,938 B1

SYSTEMS AND METHODS FOR SHAPING A REFERENCE SIGNAL IN ADVERTISING

FIELD OF THE INVENTION

This invention is generally related to advertising. This invention is more specifically related to controlling the revenue generated by an advertising campaign.

BACKGROUND

Since the early 1990's, the number of people using the Internet has grown at a substantial rate. As more users take advantage of the Internet, they generate higher and higher volumes of traffic over the Internet. As the benefits of commercializing the Internet can be tremendous, businesses increasingly take advantage of this traffic by advertising their products or services on-line. Such advertising may appear in the form of advertisements on websites or digital television or on cellular telephones, which are comparable to rented billboard space on highways and in cities or commercials broadcasted during television or radio programs.

Before users browse to a particular web page on the Internet, there is much unknown to the advertisers that might advertise on that page and to advertising managers that may conduct advertising campaigns on the advertiser's behalf. Neither the advertisers nor the advertising managers know how many users will browse to particular web pages, and therefore do not know the volume of advertisements that will be viewed (the number of "impressions"). Further, is it not known how many users will select or "click" on each advertisement or if "actions", e.g., sales or signing up new users, will result from each impression of an advertisement or what the ratio of clicks to actions may be.

Advertisers may be interested in impressions (e.g., if they are trying to increase awareness of a brand), clicks (e.g., if they are trying to provide more information about a product), or actions (e.g., if they are trying to make sales or get new users to sign up for services). Advertisers may be willing to pay for impressions, clicks, or actions, regardless of their interests. Therefore, in addition to wanting to predict impressions, clicks, and actions, one may want to predict other data related to an advertising campaign such as, for example, the ratio of impressions to clicks or actions or the ratio of clicks to actions. The predictions of such data related to advertising on the Internet may help advertisers, and the advertising managers placing advertisements on their behalf, assess the potential value of an advertisement.

SUMMARY

In accordance with the invention, a system, apparatus, and method are presented for shaping a reference signal from an advertising campaign that allocates advertisements in digital or online advertising, the method comprising receiving a reference signal; sensing a volume of revenue generating events resulting from the advertising campaign; shaping the received reference signal to adjust for variations in the volume of revenue generating events conducted by the advertising campaign; and using the shaped reference signal to determine a control signal to control the allocation of advertisements.

In some embodiments a system, apparatus and method are presented for shaping a reference signal for an online or digital advertising campaign that allocates advertisements, the method comprising: receiving a reference signal; receiving a predicted pattern for a volume of revenue generating events conducted by the advertising campaign; providing parameters representing a volume of revenue generating events conducted by the advertising campaign value; shaping the received reference signal to adjust for the predicted pattern and the volume of revenue generating events conducted by the advertising campaign; and using the shaped reference signal to determine a control signal to control the allocation of advertisements.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Typically, a digital or online advertising campaign consists of an advertiser designing an advertising campaign for one or more products or services in order to target the campaign to individuals interested in the product or service. Generally, there are three events that occur in relation to viewing an advertising campaign. The first is an "impression". This occurs when an individual views an advertisement, and its cost to the advertiser is assessed as "cost per mille" (CPM) or cost per 1,000 impressions. The second is a "click," which occurs when an individual clicks on an advertisement. The cost to the advertiser for a click is assessed as a "cost per click" (CPC). The third is an "action," which occurs when an individual makes a purchase as a result of viewing the advertisement. Unlike an impression or click, which can be measured almost instantaneously, an action may occur at some time after an impression or click. The time interval between the impression or click and the action is called lag. The lag for different advertised products or services can vary significantly. For example, the lag for an automobile purchase will typically be longer than the lag for a DVD purchase. The cost of an action is assessed as "cost per action" (CPA).

In practice, an advertising manager places advertisements from at least one advertiser in a digital or online medium. Revenue is generated for the manager, for example, by measuring the volume of impressions, clicks or actions resulting from the placed advertisements and charging the advertiser the appropriate cost based on the CPM, CPC and CPA respectively.

Figure 1:
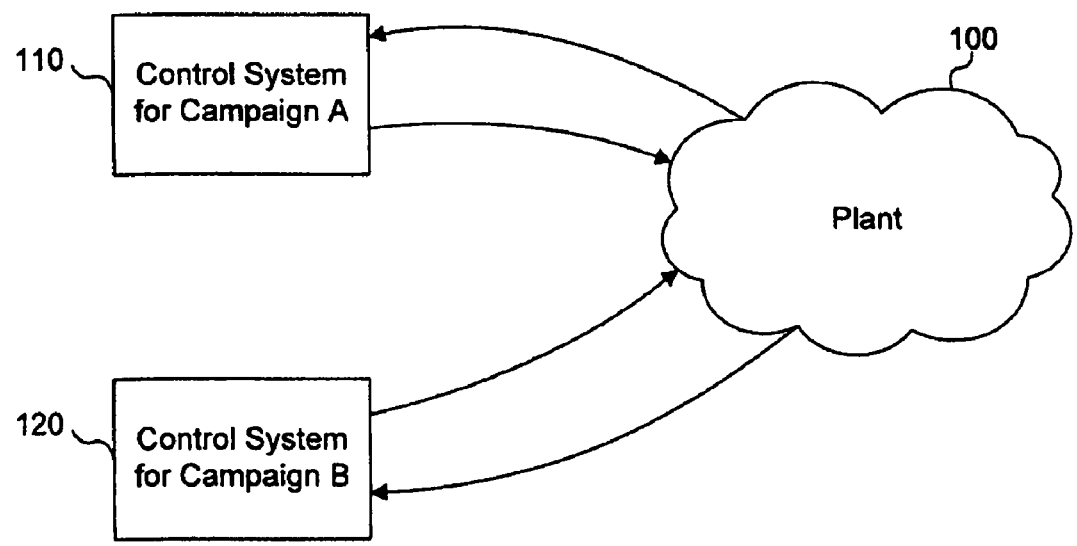
FIG. 1 is a block diagram showing a system for revenue control, consistent with an embodiment of the present invention.

FIG. 1 is a block diagram showing a system for revenue control, consistent with an embodiment of the present invention. In FIG. 1 a control system for campaign A 110 and a control system for campaign B 120, are shown, though one skilled in the art will recognize that any number of campaigns can be managed in the system of FIG. 1. Control system 110 or 120 may be a feedback, control system. Embodiments consistent with the present invention can accommodate a plurality of advertising campaigns at one time and may do so in a decentralized fashion. In the system of FIG. 1, a plant 100 represents a system to be controlled and it includes one or more active advertising campaigns managed by an advertising manager.

Control systems 110 and 120 may regulate campaign activities by sending one or more control signals which may be determined based on information about those activities. The sent control signals may be based on feedback information. For the sake of clarity, the control system for revenue delivery control will now be discussed at the campaign level.

Figure 2:
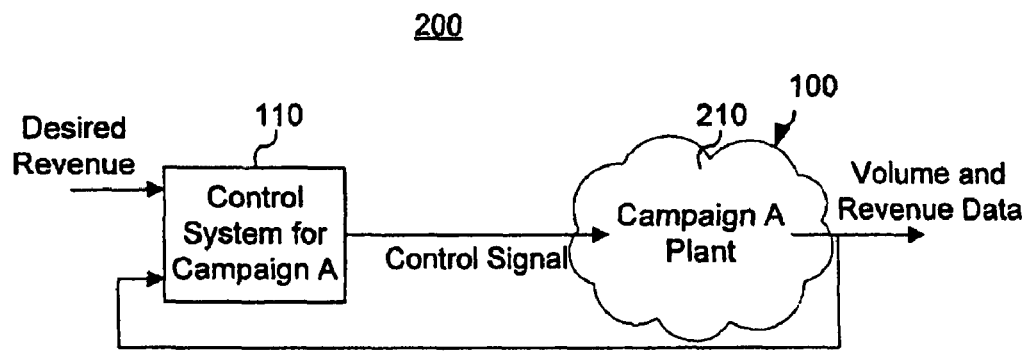
FIG. 2 is a block diagram showing a system for revenue control at a campaign level, consistent with an embodiment of the present invention.

FIG. 2 is a block diagram showing a system 200 for revenue control at the campaign level, consistent with an embodiment of the present invention. FIG. 2 also shows an example of part of the system of FIG. 1 corresponding to advertising campaign A. System 200 at the campaign level, which may be a closed loop system, as shown in FIG. 2, can be viewed as a connection between one campaign, for example, campaign A plant 210 within plant 100, and its corresponding control system 110. The input to control system 110 is composed of one or more signals indicating a desired behavior of campaign A plant 210. For example, control system 110 may receive a reference signal representative of, for example, a desired revenue, a desired impression-to-click probability, a desired impression-to-conversion probability, a desired click-to-conversion probability, a desired relative revenue generated from different segments of system 200, a desired cumulative revenue, or a desired marginal revenue for advertising campaign A to be realized by the advertising manager.

Figure 3:
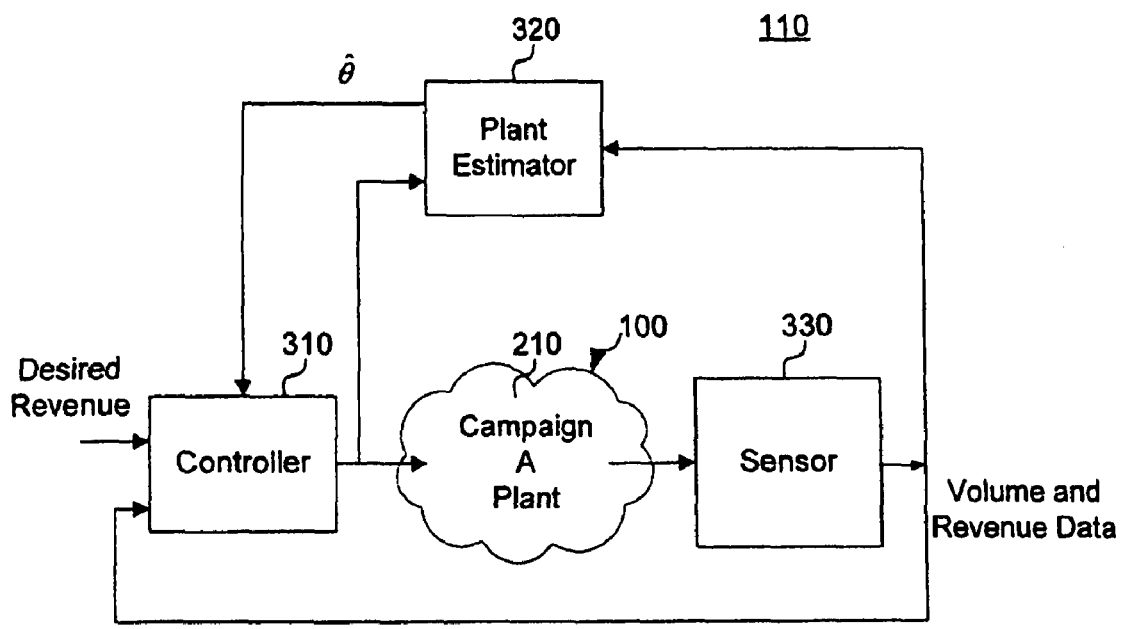
FIG. 3 is a block diagram showing interconnection of four modules in a system for revenue control, consistent with an embodiment of the present invention.

FIG. 3 is a block diagram showing the interconnection of four modules in a control system for revenue control, consistent with one possible embodiment of the present invention. For exemplary purposes, control system 110 for campaign A plant 210 is discussed below; however, a person skilled in the art will recognize that the following description can apply to any individual or group of advertising campaigns. Control system 110 shown in FIG. 3 may be a closed loop system. Control system 110 includes a controller 310, a plant estimator 320, and sensor 330 interconnected with plant 100. Control system 110 may be an adaptive control system and controller 310 may be a feedback controller. The modules of FIG. 3 are presented in the order of a possible execution sequence.

Sensor 330 may fetch data from campaign A plant 210 data flow in real time. Sensor 330 may then compute and send measurements to both controller 310 and plant estimator 320. For example, sensor 330 may output volume data relating to the number of impressions, clicks and/or actions recorded in a given period and the revenue that is generated during a given period.

Each advertising campaign can be described by a mathematical model defined by one or more plant parameters, representing certain aspects of the actual behavior of the advertising campaign. Plant estimator 320 may be configured to estimate unknown plant parameters. These plant parameter estimates may be based on plant input and output information. The plant input and output information may be reported to plant estimator 320 by sensor 330. Plant estimator 320 receives a control signal from controller 310, which may, for example, be an enhancement factor, an adjustment to a bid price, or an adjustment to a desired allocation of an advertising campaign. An output provided by plant estimator 320 is a set of plant parameters, generally denoted herein as plant parameter $\hat{\theta}$, that can be used to estimate volume and/or revenue data of an advertising campaign. More generally, the set of plant parameters may contain an arbitrary number of parameters that capture various characteristics of the underlying plant. Further, the symbol "^" is included above "θ" to indicate that the plant parameters output by plant estimator 320 are themselves estimates. The nature and use of such plant parameters is described more fully below.

Controller 310 receives the above described reference signal that, in the present embodiment directed to revenue control, represents, for example, a desired revenue, a desired impression-to-click probability, a desired impression-to-conversion probability, a desired click-to-conversion probability, a desired relative revenue generated from different segments of system 200, a desired cumulative revenue, or a desired marginal revenue for the advertising manager. Controller 310 determines in accordance with the various inputs it receives and in accordance with the mathematical model, how to control advertising campaign A plant 210, represented by a control signal output from controller 310 to campaign A plant 210.

Figure 4:
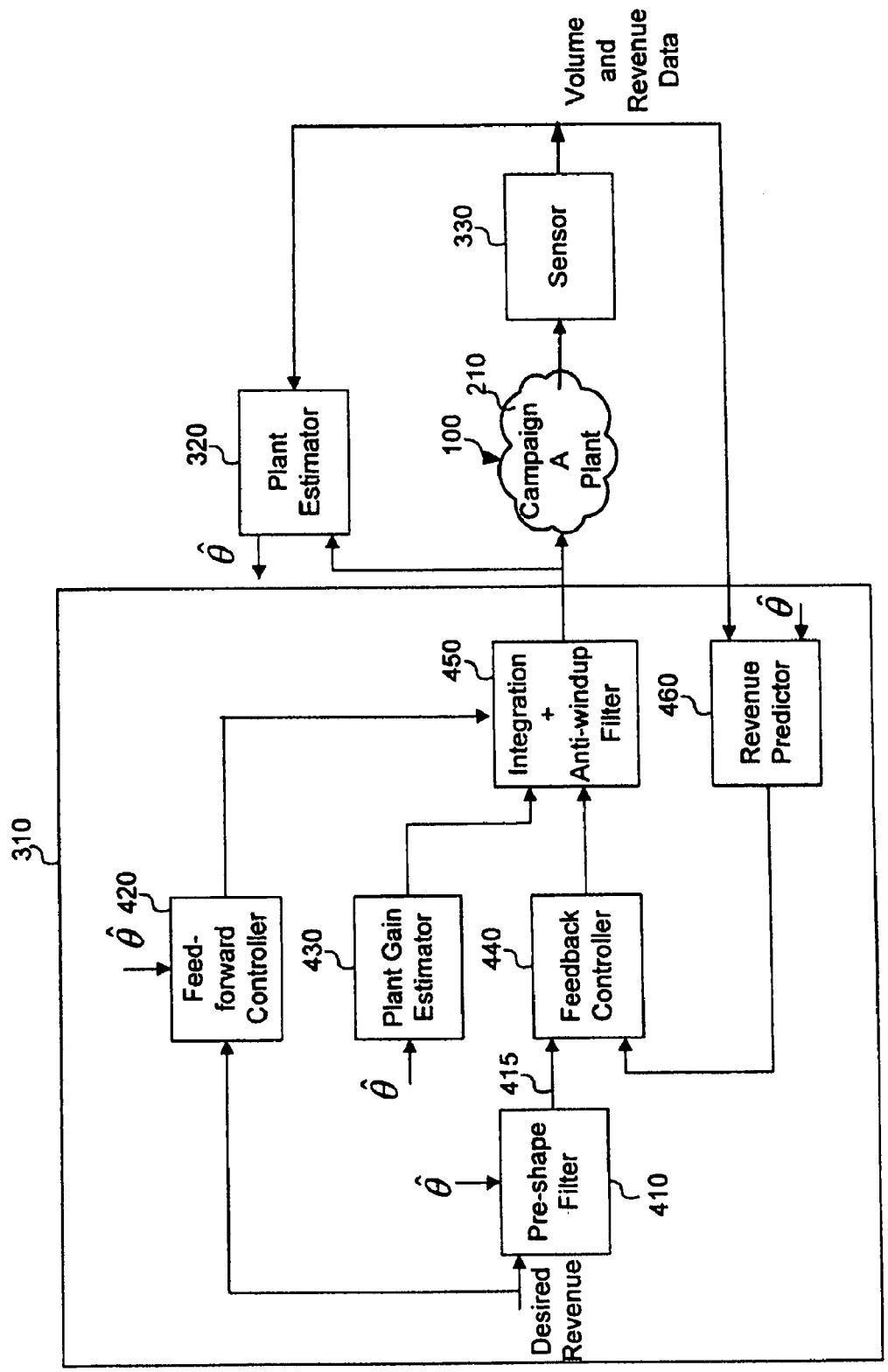
FIG. 4 is a block diagram showing a controller in a system for revenue control, consistent with an embodiment of the present invention.

FIG. 4 is a block diagram showing details of controller 310 as implemented in a system for revenue control, consistent with an embodiment of the present invention. Consistent with FIG. 3, FIG. 4 shows controller 310 which may be connected to plant estimator 320, campaign A plant 210 within plant 100 and sensor 330, and coupled to receive the reference signal provided in the present embodiment as a desired revenue, a desired impression-to-click probability, a desired impression-to-conversion probability, a desired click-to-conversion probability, a desired relative revenue generated from different segments of system 200, a desired cumulative revenue, or a desired marginal revenue. Controller 310 may include a pre-shape filter 410, a feed-forward controller 420, a plant gain estimator 430, a feedback controller 440, an integration and anti-windup filter 450 and a revenue predictor 460.

Pre-shape filter 410 may be configured to shape the received reference signal, e.g., desired revenue signal, to reflect changes in the inventory of available revenue producing events, and provide a correspondingly shaped reference signal 415. Feed-forward controller 420 is coupled to receive plant parameter $\hat{\theta}$ and may be configured to compute a preemptive control action based on changes in one or more plant parameters or the slope of the reference signal. Plant gain is defined as a relative impact on the plant when the control signal is changed. For example and without limitation, if the plant gain between control signal and revenue at some point is g and the control signal is increased by some amount d, then the revenue is expected to increase by approximately g multiplied by d. Plant gain estimator 430 is also coupled to receive plant parameter $\hat{\theta}$ and is configured to estimate the plant gain from the control signal output by controller 310 and its associated revenue. Feedback controller 440 is configured to determine a normalized incremental control action for a time period based on the shaped reference signal and a predicted cumulative revenue for the advertising campaign and generate a corresponding control signal. Integration and anti-windup filter 450 is configured to act to adjust and integrate the control signal generated by feedback controller 440 in accordance with the estimated plant gain from plant gain estimator 430. Revenue predictor 460 is coupled to receive output from sensor 330 and the plant parameter $\hat{\theta}$ and is configured to act to generate a prediction of the revenue generated by an advertising campaign during a time period.

Plant estimator 320 may provide reliable estimates for unknown parameters to feedback controller 440 so that controller 310 may predict the system behavior and tune its gains adaptively to achieve desired performance.

Control signals provided by controller 310 may be used to adjust the actual behavior of an advertising campaign so that it more closely matches a desired behavior or reference signal, e.g., desired revenue, of the advertising campaign. Such control signals may act to accelerate or decelerate the placement of advertisements for a given campaign depending on the behavior of the actual advertising campaign. Since different campaigns may have different behaviors, the control signals associated with individual campaigns may vary from one campaign to another. Furthermore, the control signals associated with a campaign may also vary with time.

Further details regarding configuration of pre-shape filter 410 are described next. If an advertising campaign measures impressions, then its associated plant parameters correspond to impression volume parameters. If the campaign measures the number of clicks, then its associated plant parameters correspond to click volume parameters. Additionally, if the campaign measures actions, then its associated plant parameters are of three types: 1) action volume parameters, 2) impression volume parameters, and 3) impression-to-action probability parameters.

Figure 7:
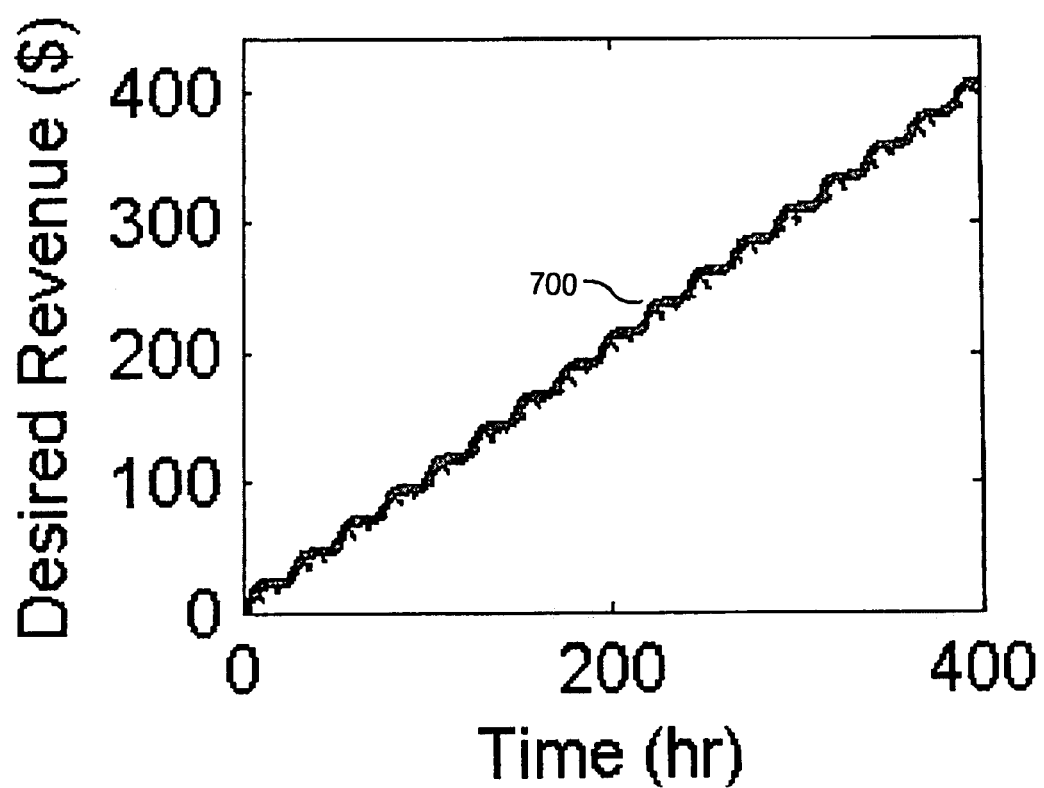
Figure 8:
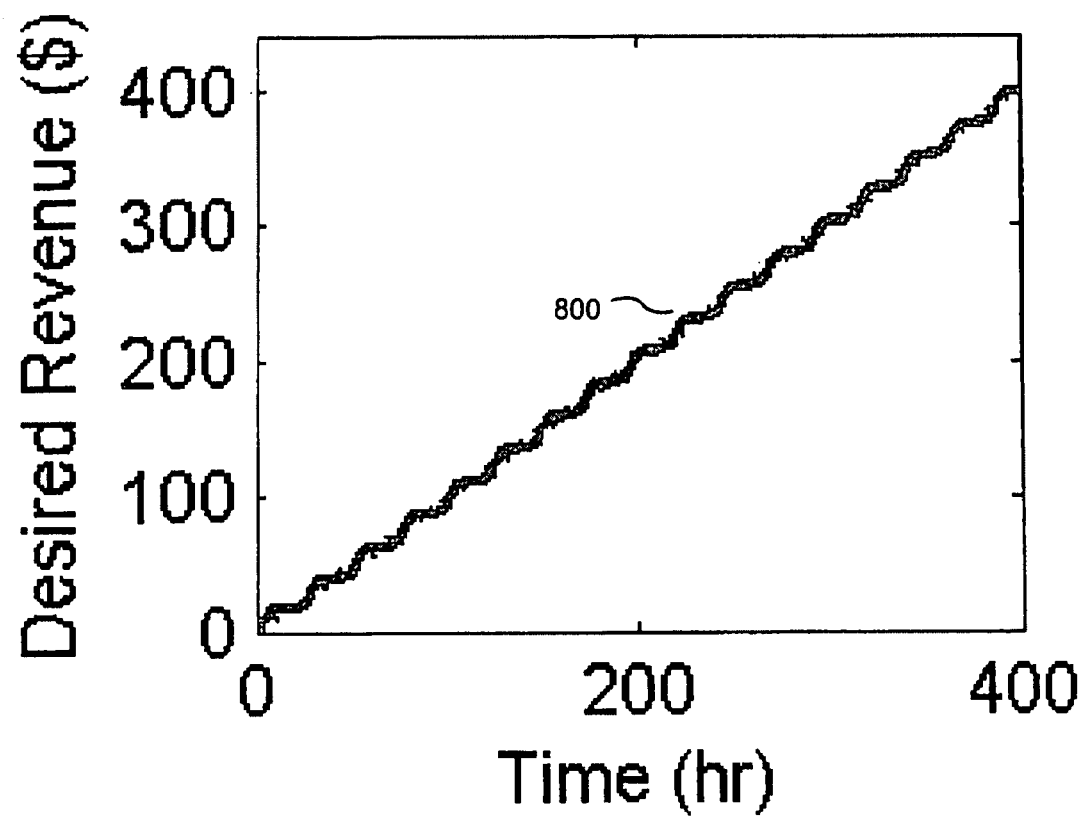

When designing an advertising campaign, an advertiser may define certain desired behaviors for the campaign. Such desired behaviors may include the overall cost of the campaign, how much money to spend on a specific day, what time of day to show the advertisements, etc. Such specific desired behaviors are formulated by the advertising manager into a reference signal which can be defined for a variety of intervals. For example, a reference signal may define the advertiser's desired revenue, a desired impression-to-click probability, a desired impression-to-conversion probability, a desired click-to-conversion probability, desired relative revenue generated from different segments of system 200, desired cumulative revenue, or a desired marginal revenue spending over the course of a 24 hour or week long period. This reference signal, corresponds to the signal shown as "Reference Signal" in FIGS. 2-4, may be represented by a straight line with fixed slope. Examples of reference signals are shown in FIGS. 6 through 8 which are described in greater detail below.

Although the reference signal may represent the desired behavior for a campaign, it is difficult to meet all of an advertiser's objectives by matching the behavior of a campaign exactly to its reference signal. This is at least due to periodic behaviors that affect the occurrence of revenue producing events. For example, the time of day affects the number of users viewing a digital or online media because people in a given geographical region do not view the Internet uniformly at all hours of the day. As would be expected, for example, viewing is greatest during the waking hours. Thus the time of day affects the number of available revenue producing events an advertiser can obtain during a given time period.

Figure 6:
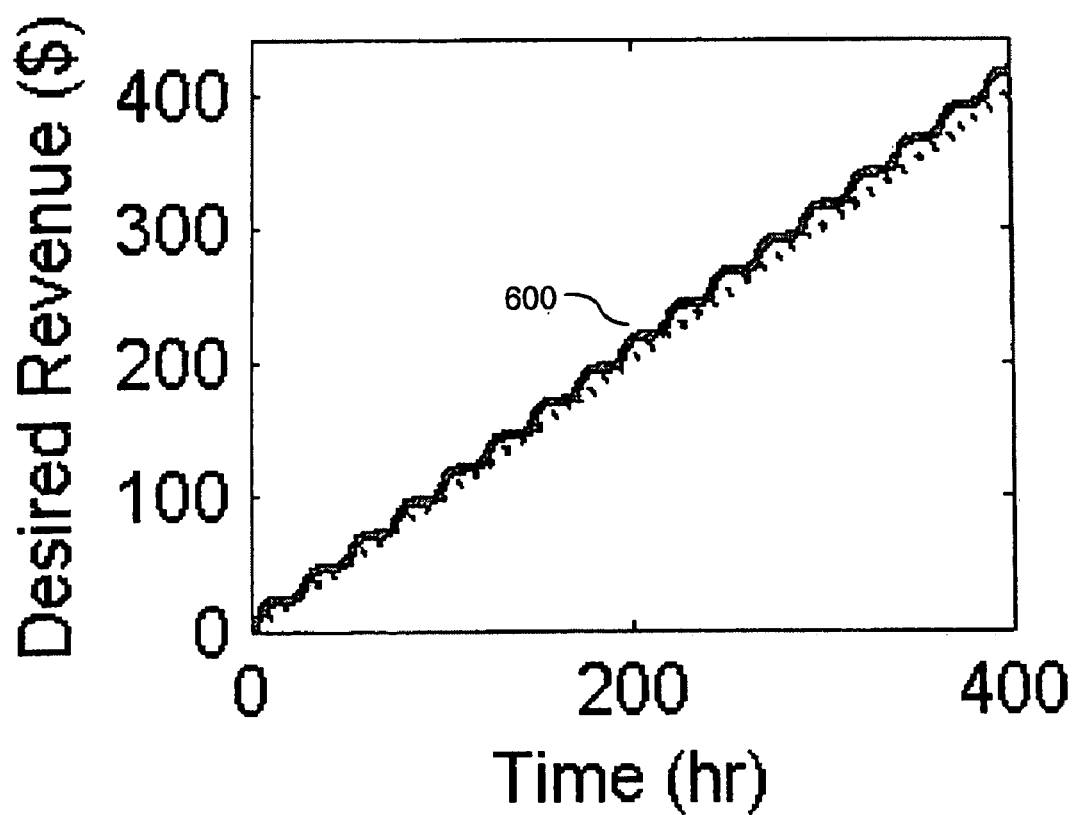
FIGS. 6 through 8 are graphs depicting reference signal behavior, consistent with an embodiment of the present invention.

A desired cumulative revenue $r_{ref}^{cum}(k)$ for a campaign may be defined as a reference signal and, for example, be provided as a fixed ramp 600 as is shown in FIG. 6. If a controller, e.g., controller 310, is designed to track a provided desired cumulative revenue as the reference signal, the result may be that the campaign pays very high prices for impressions during daily lows of Internet traffic to maintain the revenue rate prescribed by the reference signal. This may cause large oscillations in the control signal which can compromise the revenue expenditure of the advertising campaign or create unpredictable ripple effects in the entire market place.

It may be preferable for controller 310 to take into account fluctuations in the volume of Internet traffic and cause a campaign to generate larger revenue during hours when the availability of revenue producing events is large. In other words, revenue generation may be more profitable when the reference signal is not followed on an incremental basis. For example, it may be preferable for the reference signal to be tracked on a moving average or periodic basis.

Additionally and more generally, the reference signal need not be cumulative. A non-cumulative reference signal, also referred to herein as a marginal reference signal, may instead be defined. An example of such a marginal reference signal would be one that represents a desired daily revenue.

Referring again to FIG. 4, pre-shape filter 410 can modify the provided reference signal so that controller 310 does not force the campaign to generate the same revenue for every time increment of the reference signal, when there are fluctuations in the volume of available revenue producing events. These fluctuations may be periodic, thus forming a periodic pattern of available revenue producing events, or may be random in nature. Both the magnitude and phase of a periodic pattern relating to the availability of revenue producing events may vary from one campaign to another. Also, a periodic pattern may change at any time as competing campaigns are leaving or entering the network, and because the general behavior of Internet users is dynamic.

Figure 5:
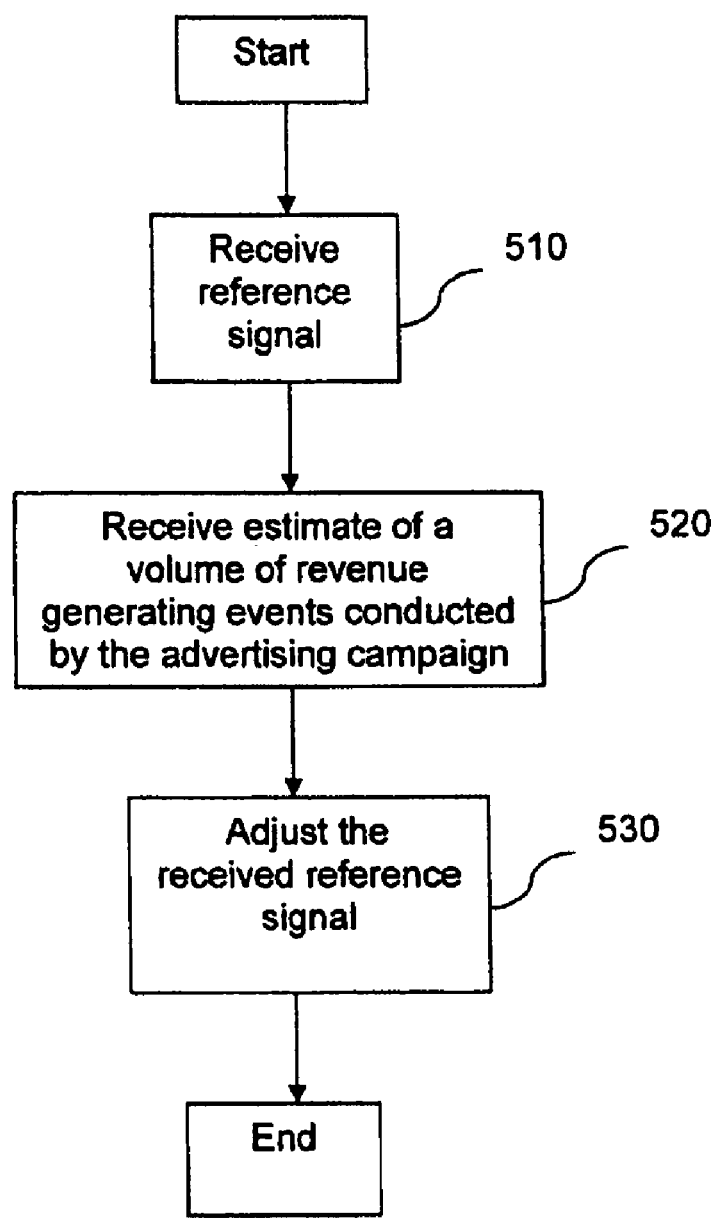
FIG. 5 is flow chart showing a method, consistent with an embodiment of the present invention

FIG. 5 illustrates a flow chart showing a method, consistent with an embodiment of the present invention. An input to pre-shape filter 410 in a time period k may include a provided cumulative reference signal $r_{ref}^{cum}(k)$ (step 510), and most recent estimates of the plant parameters $\hat{\theta}(k)$ associated with revenue generating events conducted by the campaign which can include $\hat{\theta}_I(k)$ for CPM, $\hat{\theta}_C(k)$ for CPC, or $\hat{\theta}_A(k)$ for CPA (step 520), where the subscripts I, C, and A denote impressions, clicks, and actions, respectively. The output of pre-shape filter 410 in the same time period k is given by final shaped reference signal 415, $r_{ref}^{cum,shaped}(k)$.

Pre-shape filter 410 may be used to shape the provided reference signal such that the shaped reference signal results in controller 310 providing a control signal with the smallest possible time-of-day behavior variation to track the provided reference signal on a moving average basis for a period of time, for example, a 24 hour period of time. If the campaign is desired to actually follow the provided reference signal on an increment-by-increment basis, then it may be preferable for pre-shape filter 410 not to shape the provided reference signal. Also, pre-shape filter 410 may be set so that it does not shape the provided reference signal when provided plant parameter $\theta$ is unreliable. This unreliability can occur, for example, in the initial stage of a campaign when little is known about the actual behavior of a campaign.

A model of the campaign revenue r(k) is set forth below in equation (1):

$$r(k) = \eta(k) w_{daypart}(k) e^{\beta_0 + \beta_1 \sin(2\pi k/24 + \phi_1) + \epsilon(k)} u'(k)^{\gamma} \quad (1).$$

In equation (1) $\eta(k)$ is the CPU rate ($ per event) and $\epsilon(k)$ is a stationary and mean zero stochastic process $w_{daypart}(k)$ is a binary variable capturing any day parting and has the effect of setting revenue r(k) to zero for any arbitrary hour k (if scheduling of advertisements is allowed in hour k, then $w_{daypart}(k)=1$, otherwise $w_{daypart}(k)=0$). For example, some advertisers may wish their advertisement to be shown only on certain hours or days. For example, they may wish the advertisement to be shown only on Wednesday-Sunday between 2 and 8 pm. A campaign subject to this type of constraint may be called a 'day-parted' campaign. The terms $\beta_0$, $\beta_1$, $\phi_1$, and $\gamma$ in equation (1) are plant parameters associated with revenue generating events (impressions, clicks, or conversions). More particularly, the term $\beta_0$ represents an average volume level over time, the term $\beta_1$, represents relative swings in volume throughout a time period, e.g., a day, the term $\phi_1$ represents a phase of a time-of-day pattern, and the term $\gamma$ represents how the volume relates to the control signal. The value of $\gamma$ may, for example, indicate how much the volume is likely to increase as the control signal is increased, and may differ from one campaign to another. The term $u'(k)^{\gamma}$ in equation (1) is the control signal output by controller 310 at time k. Additionally, while the present embodiment utilizes time increments in hours, embodiments consistent with the invention may be practiced with any desired time increment, e.g., seconds, minutes, days, etc.

By introducing the simplifying notations indicated below, equation (1) can be rewritten as:

$$r(k) = w_{daypart}(k) s(k|\theta) g(u'(k)|\theta) \quad (2)$$

where $$\theta = [\beta_0, \beta_1, \phi_1, \gamma]^T;$$

$$s(k|\theta) = \eta(k) e^{\beta_0 + \beta \sin(2\pi k/24 + \phi_1) + \epsilon(k)};$$

$$g(u'(k)|\theta) = u'(k)^{\gamma};$$

The term g is introduced as a general notation of the relative impact on the volume when the control signal changes, i.e., the sensitivity of the revenue in response to changes in the control signal. The term T is a mathematical notation for 'transpose'. The | between (k) and $\theta$, for example, represents that the value of $\theta$ is based upon the value of (k). Thus, the term $s(k|\theta)$ is intended to mean the function s evaluated at time point k conditioned on the knowledge of the parameter $\theta$. Thus, equation (2) is a more general model of what is shown in equation (1). That is, equation (1) is an example of the model represented by equation (2). There are many other examples besides the example represented by equation 1, of the model of equation (2), such as examples that incorporate day-of-week periodicities and /or that incorporate refined time-of-day patterns. The term s represents seasonality. Seasonality as used herein is a generalization of time-of-day pattern. Examples of seasonality are time-of-day, day-of-week, day-of-month, and annual patterns. Note that when $\epsilon$ is small, $s(k|\theta)$ is approximately equal to $s(k+24|\theta)$ in the present embodiment.

The term $r^{cum}(k)$ is the cumulated value of r(k) and can be calculated as follows:

$$r^{cum}(k) = r^{cum}(k-1) + w_{daypart}(k) s(k|\theta) g(u'(k|\theta)). \quad (3)$$

Pre-shape filter 410 may be designed to shape the reference signal with the seasonality of $s(k|\theta)$. When $\theta$ is unknown, an estimate, $\hat{\theta}(k)$, can be used to approximate $s(k|\theta)$.

Pre-shape filter 410 can determine a pre-shaped reference signal in three steps. First, a basic shaped reference signal $r_{ref}^{cum,1}(k)$ is determined. This signal may be subject to drift and bias. For example, FIG. 6 shows an exemplary desired revenue reference signal 600 that is subject to drift. Drift occurs when a signal gradually moves away from reference signal 600 over time. The shaping scheme of pre-shape filter 410 can be modified to prevent drift, with the result of a drift-free shaped reference signal $r_{ref}^{cum,2}(k)$. Drift free reference signal $r_{ref}^{cum,2}(k)$ may be subject to bias. As a further example, FIG. 7 shows an exemplary desired revenue reference signal 700 subject to bias. Bias occurs when measurements for a signal are taken at a point that is not centered with the signal, with the result that the entire signal 700 occurs above or below reference signal 600. The bias may depend on the phase $\phi_1$ of a signal and often the bias is non-zero. Finally, final shaped reference signal 415, $r_{ref}^{cum,shaped}(k)$ is derived which is unbiased and drift-free. As a still further example, FIG. 8 shows an exemplary desired revenue reference signal 800 that is not subject the drift of reference signal 600, or the bias of reference signal 700.

To obtain the basic shaped reference signal $r_{ref}^{cum,1}(k)$, the periodicity of r(k) is introduced into the calculation of $r_{ref}^{cum}(k) - r_{ref}^{cum}(k-1)$ so that:

$$r_{ref}^{cum,1}(k) - r_{ref}^{cum,1}(k-1) = c \cdot w_{daypart}(k) s(k|\theta(k)) (r_{ref}^{cum}(k) - r_{ref}^{cum}(k-1)) \quad (4)$$

where c is introduced as part of the derivation of the final estimator. It may be used to ensure that the shaped reference on average equals the original reference signal. The term c is chosen such that:

$$\sum_{i=0}^{23} (r_{ref}^{cum,1}(k+i) - r_{ref}^{cum,1}(k-1+i)) = \sum_{k=0}^{23} (r_{ref}^{cum}(k+i) - r_{ref}^{cum}(k-1+i)) \quad (5)$$

Combining equations 4 and 5 yields:

$$\sum_{i=0}^{23} c \cdot w_{daypart}(k+i) s(k|\hat{\theta}(k+i)) (r_{ref}^{cum}(k+i) - r_{ref}^{cum}(k-1+i)) = \sum_{i=0}^{23} (r_{ref}^{cum}(k+i) - r_{ref}^{cum}(k-1+i)) \quad (6)$$

and solving for c results in $$c = \frac{\sum_{i=0}^{23} (r_{cum,ref}(k+i) - r_{ref}^{cum}(k-1+i))}{\sum_{i=0}^{23} 2_{daypart}(k+i) s(k+i|\hat{\theta}(k+i)) (r_{ref}^{cum}(k+i) - r_{ref}^{cum}(k-1+i))} \quad (7)$$

When future values of $r_{ref}^{cum}(k)$ and $\hat{\theta}(k)$ are unknown, it may be assumed that $r_{ref}^{cum}(k+i)$ follows a fixed ramp and that $\hat{\theta}(k+i) = \hat{\theta}(k)$ for i=1, 2, ..., 23. For cases where this assumption is frequently violated, it may be desirable for the reference signal to not be pre-shaped. When $r_{ref}^{cum}(k+i)-r_{ref}^{cum}(k-1+i)$ equals a constant, it is possible to cancel this factor from equation (7) and obtain the following:

$$c = \frac{24}{\sum_{i=0}^{23} w_{daypart}(k+i)s(k+i|\hat{\theta}(k))} \quad (8)$$

Substituting this expression for c into equation (4) yields:

$$r_{ref}^{cum,1}(k) = \quad (9)$$

$$r_{ref}^{cum,1}(k-1) + \frac{24 \cdot w_{daypart}(k)s(k|\hat{\theta}(k))}{\sum_{i=0}^{23} w_{daypart}(k+i)s(k+i|\hat{\theta}(k))}(r_{ref}^{cum}(k) - r_{ref}^{cum}(k-1))$$

Equation (9) defines a recursive update scheme for $r_{ref}^{cum,1}(k)$ that is initialized by using the first available $r_{ref}^{cum}(k_0)$, where $k_0$ is the first hour period for which $r_{ref}^{cum}$ is provided. As used herein, a recursive update scheme is a scheme that processes new data with the same computational effort independent of how much data has been previously processed. As previously mentioned, the basic shaped reference signal $r_{ref}^{cum,1}(k)$ may be subject to drift away from $r_{ref}^{cum,1}(k)$ because $s(k|\hat{\theta}(k))$ is an approximation of $s(k|\theta(k))$. Consequently, $r_{refcum,1}(k)$ may not be a satisfactory choice for final shaped reference signal 415.

Drift may be avoided by re-initializing the shaped reference signal periodically or as needed. Periodic re-initialization may be accomplished according to the following scheme which, by way of example, uses a 24 hour long period. This scheme can be used instead of equation (9) to determine the drift free reference signal $r_{ref}^{cum,2}(k)$:

$$r_{ref}^{cum,2}(k) = \quad (10)$$

$$\begin{cases} r_{ref}^{cum,2}(k-1) + \frac{24 \cdot w_{daypart}(k)s(k|\hat{\theta}(k))}{\sum_{i=0}^{23} w_{daypart}(k+i)s(k+i|\hat{\theta}(k))}(r_{ref}^{cum}(k) - r_{ref}^{cum}(k-1)), \\ r_{ref}^{cum}(k), \end{cases}$$

if $(k \bmod 24) \neq 0$ otherwise

Equation (10) is a recursive update formula in which $r_{ref}^{cum,2}(k)$ is conveniently initialized by the first available $r_{ref}^{cum}(k_0)$, where $k_0$ is the first hour period for which $r_{ref}^{cum}$ is provided. The term $r_{ref}^{cum,2}(k)$ may not be an unbiased approximation of $r_{ref}^{cum}(k)$ when, for example, $r_{ref}^{cum,2}(k)-r_{ref}^{cum}(k)$ is not equal to zero.

The bias of a reference signal may be adjusted by estimating the bias $b_{bias}^{shaped}$ in a separate filter that may be parallel wherein the filter may not rely on an accurate estimate of $\phi_1$ or any other plant parameter. To accomplish this, the following first order linear filter may be used, which in conjunction with the scheme for computing the final shaped reference signal $r_{ref}^{cum,shaped}(k)$ is given by:

$$\hat{b}_{bias}^{shaped}(k) = \lambda_{bias}^{shaped} \hat{b}_{bias}^{shaped}(k-1) + (1-\lambda_{bias}^{shaped})(r_{ref}^{cum,2}(k) - r_{ref}^{cum}(k)) \quad (11)$$

$$r_{ref}^{cum,shaped}(k) = r_{ref}^{cum,2}(k) - \hat{b}_{bias}^{shaped}(k), \quad (12)$$

where $\hat{b}_{bias}^{shaped}(k)$ is the estimated bias, $\lambda_{bias}^{shaped}$ is a bias estimation forgetting factor and $r_{ref}^{cum,2}(k)$ is the biased shaped reference signal of equation (10). The value of the parameter $\lambda_{bias}^{shaped}$ may be in the interval 0 to 1 and the relevance of its value is in the speed in which to estimate the bias. As $\lambda_{bias}^{shaped}$ approaches 1 the estimate becomes slower but more robust. For example, setting $\lambda_{bias}^{shaped}=0.95$ may provide a desirable result.

With no prior information about plant 100, an initial estimate of the bias may be zero; hence set $\hat{b}_{bias}^{shaped}(k_0)=0$, where $k_0$ is the first time period for which the bias is computed. Combining equations (10) through (12) yields:

$$r_{ref}^{cum,2}(k) = \quad (13)$$

$$\begin{cases} r_{ref}^{cum,2}(k-1) + \frac{24 \cdot w_{daypart}(k)s(k|\hat{\theta}(k))}{\sum_{i=0}^{23} w_{daypart}(k+i)s(k+i|\hat{\theta}(k))}(r_{ref}^{cum}(k) - r_{ref}^{cum}(k-1)), \\ r_{ref}^{cum}(k), \end{cases}$$

if $(k \bmod 24) \neq 0$ otherwise $$\hat{b}_{bias}^{shaped}(k) = \lambda_{bias}^{shaped} \hat{b}_{bias}^{shaped}(k-1) + (1-\lambda_{bias}^{shaped})(r_{ref}^{cum,2}(k) - r_{ref}^{cum}(k)) \quad (14)$$

$$r_{ref}^{cm,shaped}(k) = r_{ref}^{cum,2}(k) - \hat{b}_{bias}^{shaped}(k) \quad (15)$$

Finally, replacing $s(k+i|\hat{\theta}(k))$ with $\eta(k+i)\exp(\hat{\beta}_0 + \hat{\beta}_1 \sin(2\pi(k+i)/24 + \hat{\phi}_1) + \epsilon(k+i))$, and using the approximation $\epsilon(k+i)=0$ and the assumption $\eta(k+i)=\eta(k)$ for $i=1, \ldots, 23$ yields:

$$r_{ref}^{cum,2}(k) = \quad (16)$$

$$\begin{cases} r_{ref}^{cum,2}(k-1) + \\ \frac{24 \cdot w_{daypart}(k)e^{\hat{\beta}_1 \sin(2\pi k/24 + \hat{\phi}_1)}}{\sum_{i=0}^{23} w_{daypart}(k+i)e^{\hat{\beta}_1 \sin(2\pi(k+i)/24 + \hat{\phi}_1)}}(r_{ref}^{cum}(k) - r_{ref}^{cum}(k-1)), \\ r_{ref}^{cum}(k), \end{cases}$$

if $(k \bmod 24) \neq 0$ otherwise $$\hat{b}_{bias}^{shaped}(k) = \lambda_{bias}^{shaped} \hat{b}_{bias}^{shaped}(-1) + (1-\lambda_{bias}^{shaped})(r_{ref}^{cm,2}(k) - r_{ref}^{cm}(k)) \quad (17)$$

$$r_{ref}^{cum,shaped}(k) = r_{ref}^{cum,2}(k) - \hat{b}_{bias}^{shaped}(k) \quad (18)$$

Following the above calculation, pre-shape filter 410 generates final shaped reference signal 415 (step 530). Final shaped reference signal 415 may then be transmitted by pre-shape filter 410 to another component within controller 310, for example feedback controller 440.

Figure 9:
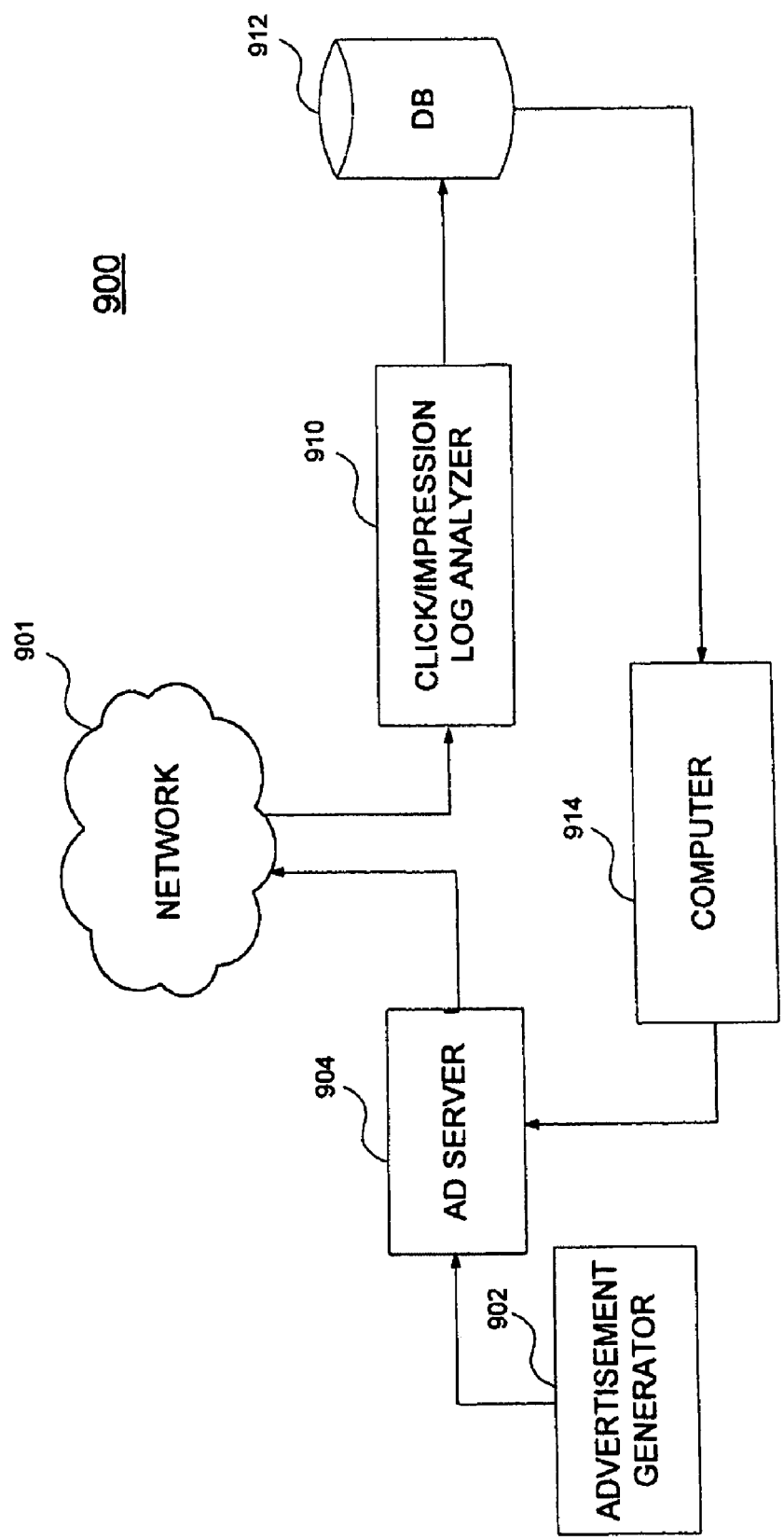
FIG. 9 is a block diagram of an exemplary computer system used to implement the present invention, according to one or more embodiments of the present invention.

FIG. 9 is a block diagram of an exemplary computer system 900 in which embodiments consistent with the present invention may be implemented. As shown in FIG. 9, according to one or more embodiments, system 900 may include at least one advertisement generating component 902, ad server 904, click/impression log analyzer 910, database 912, computer 914, and network 901, e.g., any computer data network that allows communication to occur amongst any/all components of the system. Such networks may be any network and/or combination of networks, including, for example, the Internet. According to such systems, then, advertisements can be delivered by the advertising campaign via any suitable network.

The system elements are detailed below, according to one or more embodiments of the present invention. The advertisement generating component 902 can be a machine such as a personal computer with picture making software to create advertisements suitable for display on websites. The ad-server 904 can be one or more ad-server computers capable of receiving the advertisements and the instructions about where and when to serve them and carrying out these instructions. Ad server may function as an advertising manager as discussed herein. Network 901 may include a website that has agreed, possibly in return for payment, to display the advertisements served by the ad-servers or advertising managers. Network 901 may also include one or more users that view the websites and that are therefore also viewing the advertisements. The click/impression log analyzer 910 is a click/impression analyzer used to determine the results of the showing(s) of the advertisements. The database 912 can be a database used to store the results of the showing(s) of the advertisements. The computer 914 can be a control-related computer used to handle the scheduling of the ads and to provide instructions to the ad-servers, and or implemented consistent with this invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for shaping a reference signal from an advertising campaign that allocates advertisements in digital or online advertising, the method comprising:
   receiving, by a controller, the reference signal;
   providing, by the controller, parameters representing a volume of revenue generating events resulting from the advertising campaign;
   shaping, by the controller, the received reference signal to adjust for variations in the volume of revenue generating events; and
   using, by the controller, the shaped reference signal to determine a control signal to control the allocation of advertisements.

2. The computer-implemented method of claim 1, wherein the shaping the reference signal further includes:
   shaping, by the controller, the reference signal to adjust for variations including a predicted pattern in the volume of revenue generating events conducted by the advertising campaign.

3. The computer-implemented method of claim 2, wherein the predicted pattern occurs periodically.

4. The computer-implemented method of claim 1, wherein the shaping the reference signal further includes:
   shaping, by the controller, the reference signal periodically.

5. The computer-implemented method of claim 1, wherein the shaping the reference signal further includes:
   shaping, by the controller, the reference signal based on a moving average of the volume of revenue generating events conducted by the advertising campaign.

6. The computer-implemented method of claim 1, wherein the shaping the reference signal further includes:
   shaping, by the controller, the reference signal to remove bias.

7. The computer-implemented method of claim 1, wherein the shaping the reference signal further includes:
   shaping, by the controller, the reference signal to remove drift.

8. The computer-implemented method of claim 1, wherein the reference signal is one of a desired revenue, a desired impression-to-click probability, a desired impression-to-conversion probability, a desired click-to-conversion probability, a desired relative revenue generated from different segments of a system, a desired cumulative revenue, or a desired marginal revenue.

9. A computer-implemented method for shaping a reference signal for an online or digital advertising campaign that allocates advertisements, the method comprising:
   receiving, by a controller, the reference signal;
   receiving, by the controller, a predicted pattern for a volume of revenue generating events conducted by the advertising campaign;
   receiving, by the controller, parameters representing a volume of revenue generating events conducted by the advertising campaign;
   shaping, by the controller, the received reference signal to adjust for the predicted pattern and the volume of revenue generating events conducted by the advertising campaign; and
   using, by the controller, the shaped reference signal to determine a control signal to control the allocation of advertisements.

10. The computer-implemented method of claim 9, wherein the predicted pattern occurs periodically.

11. The computer-implemented method of claim 9, wherein the shaping the reference signal further includes:
    shaping, by the controller, the reference signal periodically.

12. The computer-implemented method of claim 9, wherein the shaping the reference signal further includes:
    shaping, by the controller, the reference signal based on a moving average of the volume of revenue generating events conducted by the advertising campaign.

13. The computer-implemented method of claim 9, wherein the shaping the reference signal further includes:
    shaping, by the controller, the reference signal to remove bias.

14. The computer-implemented method of claim 13, wherein the shaping the reference signal further includes:
    shaping, by the controller, the reference signal to remove drift.

15. The computer-implemented method of claim 9, wherein the reference signal is one of a desired revenue, a desired impression-to-click probability, a desired impression-to-conversion probability, a desired click-to-conversion probability, a desired relative revenue generated from different segments of a system, a desired cumulative revenue, or a desired marginal revenue.

16. An apparatus for shaping a reference signal from an advertising campaign that allocates advertisements in digital or online advertising, the apparatus comprising:

a memory to store data and instructions; and a processor configured to access the memory and, when executing the instructions, to:
 receive the reference signal;
 estimate parameters representing a volume of revenue generating events resulting from the advertising campaign;
 shape the received reference signal to adjust for variations in the volume of revenue generating events conducted by the advertising campaign; and
 determine, using the shaped reference signal, a control signal to control the allocation of advertisements.

* * * * *